US012688776B2

(12) United States Patent
Doi

(10) Patent No.: US 12,688,776 B2
(45) Date of Patent: Jul. 21, 2026

(54) ALERT APPARATUS AND ALERT METHOD OF A VEHICLE

(71) Applicant: TOYOTA JIDOSHA KABUSHIKI KAISHA, Aichi (JP)

(72) Inventor: Tomoyuki Doi, Toyota (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 117 days.

(21) Appl. No.: 18/907,600

(22) Filed: Oct. 7, 2024

(65) Prior Publication Data

US 2025/0131826 A1 Apr. 24, 2025

(30) Foreign Application Priority Data

Oct. 24, 2023 (JP) ................................ 2023-182236

(51) Int. Cl.
*G08G 1/16* (2006.01)

(52) U.S. Cl.
CPC .................................. *G08G 1/166* (2013.01)

(58) Field of Classification Search
CPC .................................................... G08G 1/166
See application file for complete search history.

(56) References Cited

U.S. PATENT DOCUMENTS 8,355,851 B2 1/2013 Inoue et al.
8,370,040 B2 2/2013 Inoue et al.
8,417,430 B2 4/2013 Saeki
8,548,709 B2 10/2013 Morita
8,768,597 B2 7/2014 Kagawa
9,174,643 B2 11/2015 Aso
9,776,630 B2 * 10/2017 Goudy .................. B60W 50/14
10,017,178 B2 7/2018 Morimoto et al.
10,118,617 B2 11/2018 Urano et al.
10,486,698 B2 11/2019 Masui et al.
10,994,724 B2 * 5/2021 Matsumura ............ B60K 28/06
2005/0137775 A1 6/2005 Sekiguchi
2017/0225677 A1 * 8/2017 Yoshida .............. B60W 30/025
(Continued)

FOREIGN PATENT DOCUMENTS

JP H06-231400 A 8/1994
JP 2005-178518 A 7/2005
JP 6447465 B2 1/2019

*Primary Examiner* — Mohamed Barakat
(74) *Attorney, Agent, or Firm* — HAUPTMAN HAM, LLP

(57) ABSTRACT

A driving support ECU of an alert apparatus obtains, when the ECU determines that a rapid approach condition becomes satisfied while a following preceding vehicle state in which the host vehicle is traveling so as to follow the preceding vehicle owing to a driving operation by the host vehicle driver is occurring, operation characteristics values representing characteristics of a deceleration operation performed by the host vehicle driver to decelerate the host vehicle after a time point at which the rapid approach condition becomes satisfied, and store operation characteristics learning values that vary depending on the operation characteristics values. When the ECU determines that the following preceding vehicle state has newly occurred, the ECU calculates, based on the operation characteristics learning values, a required inter-vehicular distance, and performs an alert operation when the ECU determines the inter-vehicular distance currently obtained is equal to or shorter than the required inter-vehicular distance.

6 Claims, 6 Drawing Sheets

(56) References Cited

U.S. PATENT DOCUMENTS

| | | | | |
|---|---|---|---|---|
| 2019/0147304 | A1* | 5/2019 | Liu | G06N 3/084<br>382/157 |
| 2019/0295419 | A1 | 9/2019 | Tosa et al. | |
| 2019/0391582 | A1* | 12/2019 | Jung | B60W 30/16 |
| 2020/0216070 | A1* | 7/2020 | Okamoto | B60W 30/16 |
| 2020/0298852 | A1* | 9/2020 | Tanaka | G06V 20/588 |
| 2025/0108783 | A1* | 4/2025 | Oniwa | B60T 7/22 |

* cited by examiner

B1

| Inter-vehicular time Tint | T1≦Tint<T2 | T2≦Tint<T3 | … | Tn≦Tint<Tm |
|---|---|---|---|---|
| Reaction time learning value Tr | Tr1 | Tr2 | … | Trn |
| Maximum deceleration learning value Gm | Gm1 | Gm2 | … | Gmn |
| Deceleration change rate learning value Jm | Jm1 | Jm2 | … | Jmn |

ALERT APPARATUS AND ALERT METHOD OF A VEHICLE

RELATED APPLICATIONS

The present application claims priority to Japanese Patent Application No. 2023-182236, filed Oct. 24, 2023, the disclosure of which is hereby incorporated by reference herein in its entirety.

TECHNICAL FIELD

The present disclosure relates to an alert apparatus of a vehicle that performs an alert operation to alert a host vehicle driver (call a driver's attention of a host vehicle) when an inter-vehicular distance between a host vehicle and a preceding vehicle is short. The present disclosure also relates to an alert method thereof and a storing device storing program thereof.

BACKGROUND

One of conventional alert apparatuses (hereinafter, referred to as a "conventional apparatus"), disclosed in Japanese Patent Application Laid-Open No. H06-231400, estimates a maximum value of a shortened amount of the inter-vehicular distance between the host vehicle and the preceding vehicle (i.e., a maximum distance-of-coming-closer-to-each-other), based on a preceding vehicle speed, a deceleration of the preceding vehicle, a host vehicle speed, an assumed deceleration of the host vehicle, and a free running time (brake lag time) of the host vehicle that is a time length up to a time point at which the host vehicle starts to be braked.

The conventional apparatus issues an alert when a current inter-vehicular distance between the host vehicle and the preceding vehicle is equal to or shorter than an "appropriate inter-vehicular distance" determined based on the estimated maximum distance-of-coming-closer-to-each-other.

A "time length from a time point at which the driver releases an accelerator pedal to a time point at which he/she starts to press a brake pedal (i.e., a time for retreading/switching pedals, corresponding to the free running time (brake lag time))" and a "deceleration of the host vehicle caused by pressing the brake pedal" vary depending on each driver. Therefore, the maximum distance-of-coming-closer-to-each-other and the appropriate inter-vehicular distance vary depending on each driver. In view of this, the conventional apparatus measures an actual time length for retreading/switching pedals, and uses a value determined based on the measured time length as the "free running time (brake lag time)" to calculate the appropriate inter-vehicular distance. Further, the conventional apparatus measures an actual deceleration of the host vehicle caused by pressing the brake pedal, and uses a value determined based on the measured deceleration as the "assumed deceleration of the host vehicle" to calculate the maximum distance-of-coming-closer-to-each-other.

SUMMARY

However, the conventional apparatus measures "the time length for retreading/switching pedals and the deceleration of the host vehicle" not only when the host vehicle rapidly comes closer to the preceding vehicle but also when the vehicle travels ordinarily. Therefore, the time length for retreading/switching pedals and the assumed deceleration are not appropriate values for a critical situation (i.e., a state for which the maximum distance-of-coming-closer-to-each-other should be obtained). As a result, since the maximum distance-of-coming-closer-to-each-other and the appropriate inter-vehicular distance differ from respective appropriate values, the alert may not be performed/issued at an appropriate timing.

The present disclosure is made to cope with the above-described problem. Namely, one of objects of the present disclosure is to provide an alert apparatus and an alert method that is capable of performing an alert operation to alert each of the drivers of the host vehicle (e.g., displaying an alert and/or generating an alert sound) for calling the driver's attention to the preceding vehicle at a more appropriate timing for each of the drivers.

One of embodiments of the present disclosure (hereinafter, referred to as a "present disclosure") comprises:

- a first obtaining device (71-76) that obtains host vehicle information including information on a host vehicle speed which is a speed of a host vehicle and information on an operation state of a brake pedal of the host vehicle;
- a second obtaining device (20, 30) that obtains preceding vehicle information including information on an inter-vehicular distance between a preceding vehicle and the host vehicle and information on a relative speed of the preceding vehicle;
- an alert device (40-42) that performs, as an alert operation to call a host vehicle driver's attention, at least one of an alert display and an alert sound generation; and
- a controller (10) that controls the alert device.

The controller is configured to

- when the controller determines, based on the host vehicle information and the preceding vehicle information, that a predetermined rapid approach condition becomes satisfied, the rapid approach condition being a condition to be satisfied when the host vehicle and the preceding vehicle start to rapidly come closer to each other (S230: Yes), while a following preceding vehicle state in which the host vehicle is traveling so as to follow the preceding vehicle owing to a driving operation by the host vehicle driver is occurring (S220: Yes), obtain, based on the host vehicle information, operation characteristics values representing characteristics of a deceleration operation performed by the host vehicle driver to decelerate the host vehicle after a time point at which the rapid approach condition becomes satisfied (S340, S450, S455), and store operation characteristics learning values that vary depending on the operation characteristics values in a storing device (S350, S450, S455); and
- when the controller determines that the following preceding vehicle state has newly occurred, calculate, based on the operation characteristics learning values, a required inter-vehicular distance which the host vehicle should maintain between the host vehicle and the preceding vehicle (S505-S592), and cause the alert device to perform the alert operation when the controller determines that an alert condition including a condition to be satisfied when the inter-vehicular distance currently obtained is equal to or shorter than the required inter-vehicular distance is satisfied (S594).

According to the present apparatus, the operation characteristics values representing characteristics of the deceleration operation performed by the host vehicle driver is obtained when and after the host vehicle and the preceding vehicle start to rapidly come closer to each other (namely, when and after the rapid approach condition becomes satisfied), and the operation characteristics learning values varying depending on the operation characteristics values are obtained and stored. Furthermore, the operation characteristics learning values are used to calculate the required inter-vehicular distance. Therefore, the required inter-vehicular distance can be values corresponding to the deceleration operation characteristics in the critical situation for each driver. Accordingly, the alert operation can be performed at a more appropriate timing.

Notably, in the above description, in order to facilitate understanding of the present disclosure, the constituent elements corresponding to those of an embodiment which will be described later are accompanied by parenthesized symbols and/or names which are used in the embodiment; however, the constituent elements of the disclosure are not limited to those in the embodiment defined by the symbols and/or names. The present disclosure covers an alert method for a vehicle, and a program thereof.

DETAILED DESCRIPTION

Figure 1:
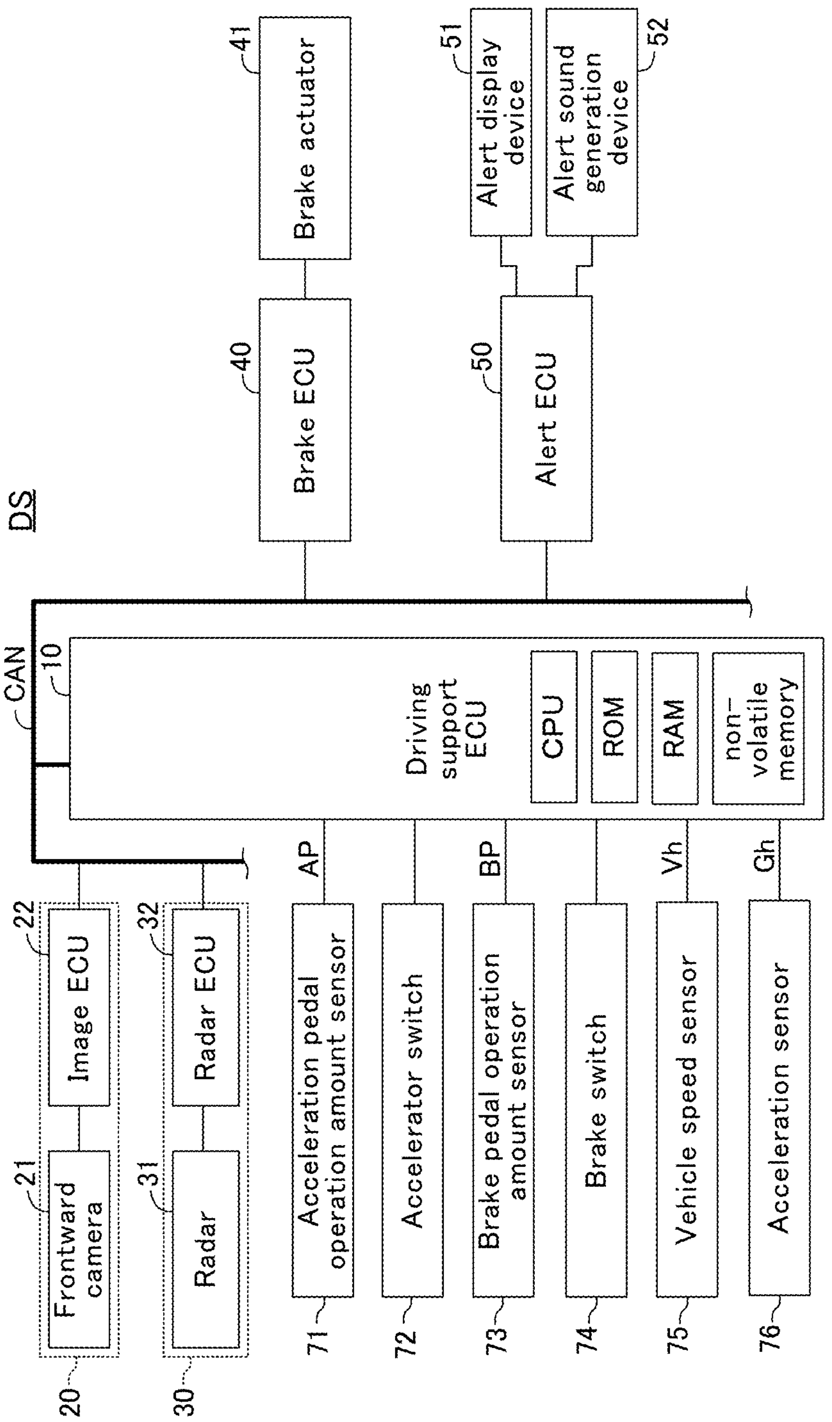
FIG. 1 is a schematic diagram of an alert apparatus of a vehicle according to an embodiment of the present disclosure.

An alert apparatus DS (hereinafter, referred to as an "apparatus DS") according to an embodiment of the present disclosure comprises components/elements illustrated in FIG. 1. The apparatus DS is applied to or is mounted on a host vehicle. The host vehicle is a vehicle having an internal combustion engine as a drive source, but may be an electric vehicle, or a hybrid vehicle. Namely, the drive source of the host vehicle may be any kind of drive sources.

In the present specification, an "ECU" means an electronic control unit, that includes a microcomputer as a main component. The microcomputer includes a CPU (processor), and storing devices including a ROM, a RAM, a data writable involatile memory, or the like. The ECU may sometimes be referred to as a "controller" or a "computer". A plurality of ECUs shown in FIG. 1 are connected to each other through Controller Area Network (CAN) in such a manner that they can exchange information with each other.

A driving support ECU 10 performs an "inter-vehicular distance alert control" described later in detail.

A frontward camera device 20 includes a frontward camera 21 and an image ECU 22. The frontward camera 21 captures (or takes a picture of) a "scene in front of the host vehicle" so as to obtain image data, every time a predetermined time elapses. The image ECU 22 produces camera information by analyzing the image data sent from the frontward camera 21, and transmits the camera information to the driving support ECU 10. The camera information includes demarcation line information on "a position and a type of a demarcation line" and camera object information on "a position with respect to the host vehicle, a longitudinal relative speed, a lateral relative speed, and a type" of a captured/photographed object.

The radar device 30 is a well-known device configured to obtain information on an object in front of the host vehicle using electrical waves in a millimeter waveband, and includes a radar 31 and a radar ECU 32. The radar 31 transmits information on transmitted electrical waves and on received electrical waves (reflected electrical waves) to the radar ECU 32. The radar ECU 32 obtains radar information based on the information sent from the radar 31, and transmits the radar information to the driving support ECU 10. The radar information includes a distance to the object, an azimuth of the object, and a relative speed of the object. It should be noted that the relative speed of the object is positive when the object is coming closer to the host vehicle.

The driving support ECU 10 specifies a preceding vehicle based on the camera information and the radar information, and obtains an "inter-vehicular distance between the host vehicle and the preceding vehicle" and the "relative speed of the preceding vehicle". The preceding vehicle is an other vehicle that is present in a lane (host vehicle lane) in which the host vehicle is running, and that is running in the same direction as the host vehicle immediately in front of the host vehicle.

A brake ECU 40 drives a brake actuator 41 based on (in accordance with) a brake pedal operation amount BP detected by a brake pedal operation amount sensor 73 described later, to thereby control a brake device of the host vehicle. More specifically, the brake ECU 40 adjusts the brake force applied to the host vehicle in such a manner that a deceleration (a negative acceleration) of the host vehicle becomes greater as the brake pedal operation amount BP becomes greater.

An alert ECU 50 causes an alert/warning display device 51 to display an alert/warning, and causes an alert sound generation device 52 to generate an alert sound, in response to an instruction sent from the driving support ECU 10.

The driving support ECU 10 receives detected values (output values) of sensors and switches described below.

An acceleration pedal operation amount sensor 71 that detects an operation amount AP of the acceleration pedal of the host vehicle.

An accelerator switch 72 that outputs an ON-signal when the accelerator pedal is in a state where the accelerator pedal is pressed, and that outputs an OFF-signal when the accelerator pedal is in a state where the accelerator pedal is not pressed (i.e. is released).

A brake pedal operation amount sensor 73 that detects an operation amount BP of the brake pedal of the host vehicle.

A brake switch 74 that outputs an ON-signal when the brake pedal is in a state where the brake pedal is pressed, and that outputs an OFF-signal when the brake pedal is in a state where the brake pedal is not pressed (i.e. is released).

A vehicle speed sensor 75 that detects a speed of the host vehicle (i.e., host vehicle speed Vh).

An acceleration sensor 76 that detects an acceleration of the host vehicle in a front-rear direction. It should be noted that, in the present specification, a deceleration (a negative acceleration G) of the host vehicle in the front-rear direction is expressed as a positive value Gh (=−G).

Outline of Operation

The apparatus DS obtains values described below as "values representing (indicative of) characteristics of a deceleration operation performed by the driver of the host vehicle to decelerate the host vehicle (i.e., operation characteristics values)" when the preceding vehicle starts to decelerate so as to rapidly come closer to the host vehicle in a state where the host vehicle has been traveling/running at the same speed as the preceding vehicle speed to follow the preceding vehicle owing to the driving operation by the driver of the host vehicle (i.e., while a following preceding vehicle state is occurring).

(1) A time (time length) from a time point at which a rapid approach of the preceding vehicle is detected (i.e., a rapid approach detected time point at which a rapid approach condition becomes satisfied) to a time point at which the driver of the host vehicle starts the decelerating operation to decelerate the host vehicle. This time length (duration) may sometimes be referred to as a "reaction time" or a "free running time". A start time point of the decelerating operation is a time point at which the signal of the brake switch 74 changes from the OFF-signal to the ON-signal, but may be a time point at which the signal of the accelerator switch 72 changes from the ON-signal to the OFF-signal.

(2) A maximum value of a deceleration (maximum deceleration) of the host vehicle caused by a brake operation (press of the brake pedal) after the rapid approach of the preceding vehicle is detected.

(3) A deceleration change rate (an increasing amount of the deceleration per unit time) before a time point at which the deceleration caused by the brake operation after the rapid approach of the preceding vehicle is detected reaches a maximum deceleration (or become the greatest).

The apparatus DS obtains, through calculation, based on the above-described operation characteristics values (the reaction time, the maximum deceleration, and the deceleration change rate), operation characteristics learning values (including a reaction time learning value, a maximum deceleration learning value, and a deceleration change rate learning value) for each of inter-vehicular time ranges (time ranges) to which an inter-vehicular time (=the inter-vehicular distance/the host vehicle speed) of when the rapid approach of the preceding vehicle is detected corresponds. The apparatus DS stores the obtained operation characteristics learning values as the operation characteristics learning values for the respective inter-vehicular time ranges in the nonvolatile memory serving as a storing device.

When the host vehicle is traveling/running so as to follow the preceding vehicle owing to the driving operation by the driver of the host vehicle, the apparatus DS reads out (fetches) the operation characteristics learning values corresponding to the current inter-vehicular time from the nonvolatile memory, calculates the maximum distance-of-coming-closer-to-each-other using the operation characteristics learning values, and calculates a required inter-vehicular distance based on the maximum distance-of-coming-closer-to-each-other. It should be noted that the maximum distance-of-coming-closer-to-each-other is a maximum value of a change amount of the inter-vehicular distance (i.e., a shortened distance) in a period from a time point (present time point) at which it is assumed that the preceding vehicle starts to come closer to the host vehicle to a time point at which the host vehicle comes closest to the preceding vehicle. The apparatus DS performs an alert display operation (to display an alert for calling the driver's attention of the host vehicle) and/or an alert sound generation operation (to generate the alert sound for calling the driver's attention of the host vehicle).

(Specific Operation)

<Obtaining Learning Values>

Figure 2:
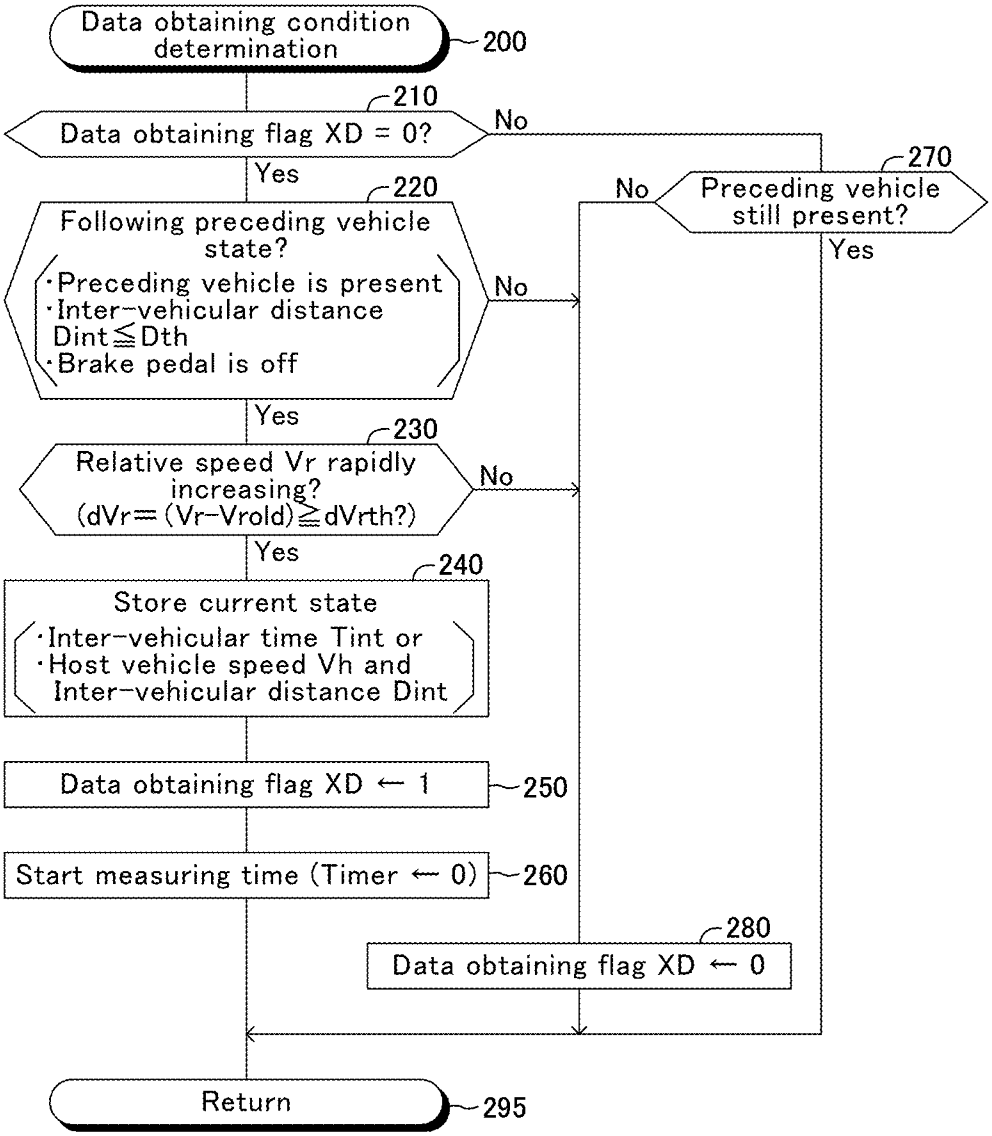
FIG. 2 shows a routine executed by a CPU of a driving support ECU shown in FIG. 1.

The CPU of the driving support ECU 10 (hereinafter, simply referred to as a "CPU") executes routines shown by flowcharts in FIGS. 2-4, every time a predetermined time (calculation cycle) elapses.

Hereinafter, "step" is expressed as "S". When an appropriate time point comes, the CPU starts processing from S200 in FIG. 2, and proceeds to S210. At S210, the CPU determines whether or not a value of a data obtaining flag XD is "0". The value of the data obtaining flag XD is set to "1" while data for calculating the learning values are being obtained (refer to S250 described later).

When the value of the data obtaining flag XD is "0", the CPU proceeds to S220 from S210, and determines whether or not the host vehicle is currently traveling/running to follow the preceding vehicle (i.e., whether or not the following preceding vehicle state is occurring). More specifically, the CPU determines that the following preceding vehicle state is occurring when it determines, based on the camera information and the radar information, that the preceding vehicle is present, the inter-vehicular distance Dint between the host vehicle and the preceding vehicle is equal to or shorter than a threshold distance Dth, and the output signal (brake signal) of the brake switch 74 is the OFF-signal.

When the following preceding vehicle state is occurring, the CPU proceeds to S230 from S220, and determines whether or not the inter-vehicular distance Dint between the host vehicle and the preceding vehicle is rapidly decreasing (i.e., whether or not the host vehicle is rapidly coming closer to the preceding vehicle). More specifically, the CPU determines whether or not the rapid approach condition becomes satisfied. The rapid approach condition is a condition to be satisfied when a relative speed increasing amount dVr is equal to or greater than a relative speed threshold dVrth. The relative speed increasing amount dVr is obtained by subtracting a relative speed Vrold a predetermined time before the present time point from a present/current relative speed Vr.

When the relative speed increasing amount dVr is equal to or greater than the relative speed threshold dVrth (i.e., when the rapid approach condition becomes satisfied), the CPU makes a "Yes" determination at S230, and executes the processes of steps from S240 to S260 described below, and thereafter, proceeds to S295 so as to terminate the present routine tentatively.

S240: The CPU stores the current inter-vehicular time Tint (=a value obtained by dividing the current inter-vehicular distance Dint by the current host vehicle speed Vh), as a value representing a current state/situation.

S250: The CPU sets the value of the data obtaining flag XD to "1".

S260: The CPU sets a value of a timer Timer to "0". The timer Timer is for measuring an elapsed time (length) since the time point at which the relative speed Vr starts increasing rapidly (i.e., the time point at which the rapid approach condition becomes satisfied).

If the value of the data obtaining flag XD is not "0" when the CPU proceeds to S210, the CPU proceeds to S270 from S210, and determines whether or not the preceding vehicle is still present. When the preceding vehicle is still present, the CPU directly proceeds to S295. Whereas, when the preceding vehicle is not present, the CPU proceeds to S280 from S270 so as to set the value of the data obtaining flag XD to "0". Thereafter, the CPU proceeds to S295.

If the following preceding vehicle state is not occurring when the CPU proceeds to S220, the CPU proceeds to S280 from S220. In addition, if the relative speed Vr is not rapidly increasing when the CPU proceeds to S230, the CPU proceeds to S280 from S230.

Figure 3:
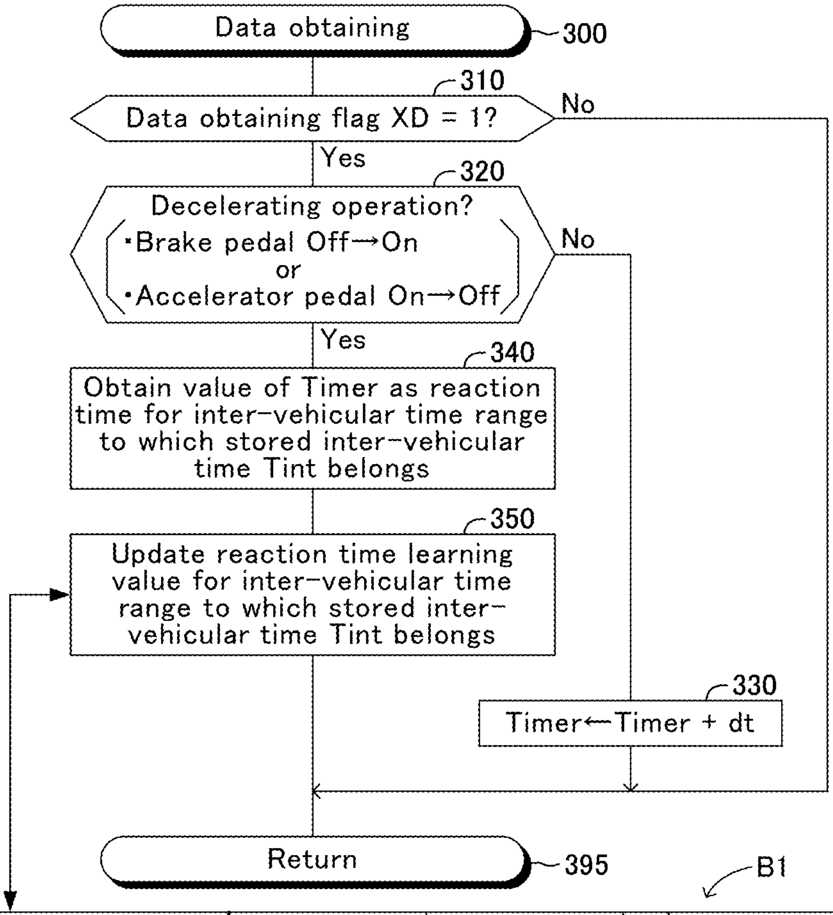
FIG. 3 shows a routine executed by the CPU of the driving support ECU shown in FIG. 1.

When an appropriate time point comes, the CPU starts processing from S300 in FIG. 3, and proceeds to S310. At S310, the CPU determines whether or not the value of the data obtaining flag XD is "1". When the value of the data obtaining flag XD is not "1", the CPU directly proceeds to S395 from S310 so as to terminate the present routine tentatively.

Whereas, when the value of the data obtaining flag XD is "1", the CPU proceeds to S320 from S310, and determines whether or not the decelerating operation has been performed by determining whether or not the signal of the brake switch 74 has changed from the OFF-signal to the ON-signal. It should be noted that the CPU may determine that the decelerating operation has been performed, when the signal of the accelerator switch 72 has changed from the ON-signal to the OFF-signal.

When the CPU determines that the decelerating operation has not been performed, the CPU proceeds to S330 from S320 to increase the value of the timer Timer by a predetermined time (calculation cycle) dt. Thereafter, the CPU proceeds to S395.

Whereas, when the CPU determines that the decelerating operation has been performed, the CPU proceeds to S340 from S320. At S340, the CPU obtains the value of the timer Timer as the reaction time for (corresponding to) the inter-vehicular time range (time range) to which the inter-vehicular time Tint stored at S240 shown in FIG. 2 belongs. Furthermore, at S350, the CPU obtains, through calculation, the reaction time learning value Tr for that inter-vehicular time range based on the reaction time for that inter-vehicular time range, and proceeds to S395. It should be noted that the driving support ECU 10 has been stored a look-up table shown in a block B1 in FIG. 3 in the nonvolatile memory. For example, when the inter-vehicular time Tint stored at S240 is between T2 and T3, the CPU reads out (fetches) the reaction time learning value Tr2 stored in the inter-vehicular time range to which the inter-vehicular time Tint stored at S240 belongs, and applies that read out "reaction time learning value Tr2" and the "value of the timer Timer at that time (i.e., the obtained reaction time)" to a right side of the following equation so as to update the reaction time learning value Tr2, and stores the updated reaction time learning value Tr2 in the "inter-vehicular time range to which the inter-vehicular time Tint stored at S240 belongs" of the look-up table. Here, a is a value between "0" and "1", and the left side of the following equation is the updated reaction time learning value Tr2.

$$Tr2 = \alpha \cdot \text{Timer} + (1 - \alpha) \cdot Tr2$$

The other reaction time learning value Trn is updated in the same manner.

Figure 4:
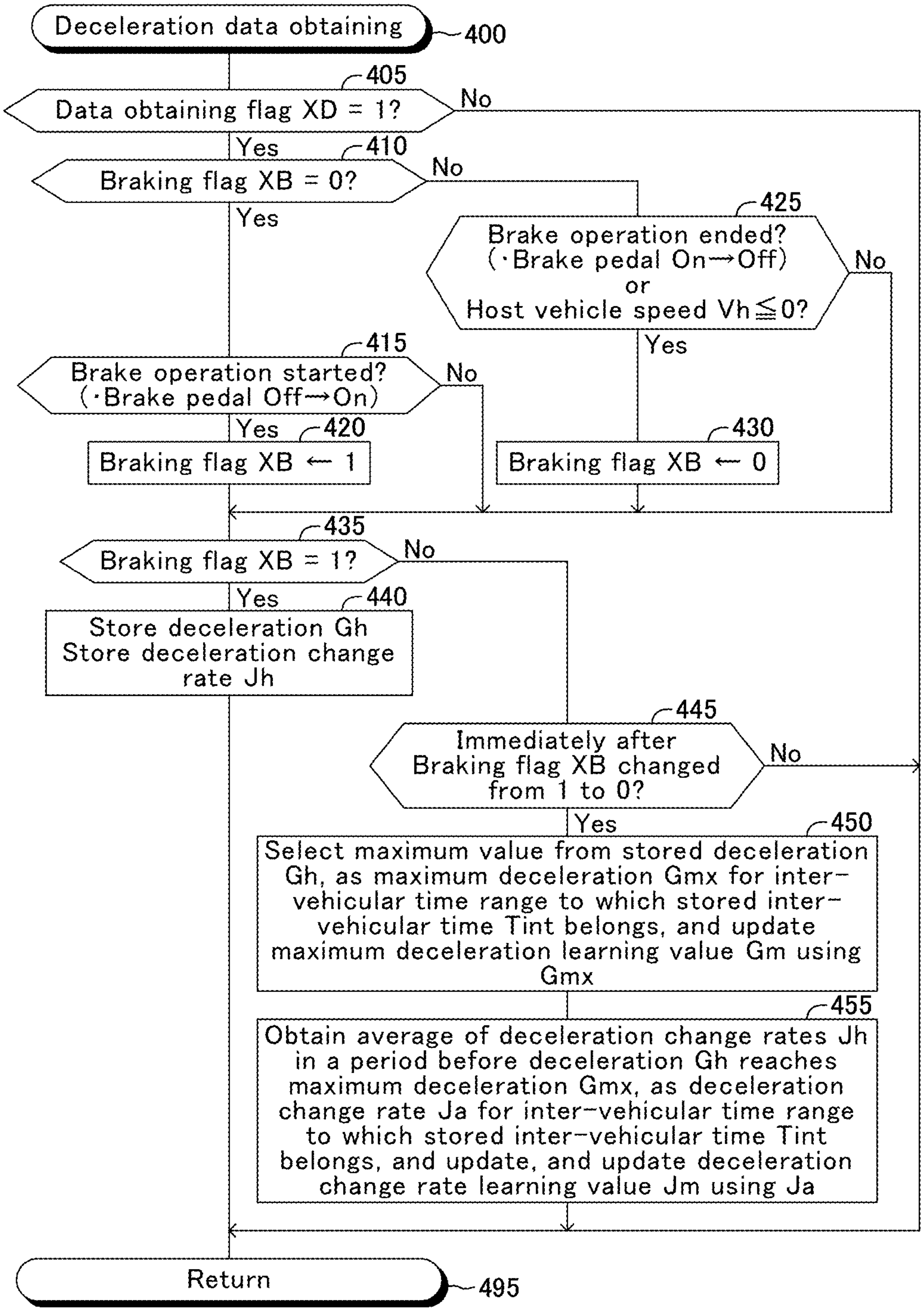
FIG. 4 shows a routine executed by the CPU of the driving support ECU shown in FIG. 1.

When an appropriate time point comes, the CPU starts processing from S400 in FIG. 4, and proceeds to step 405. At step 405, the CPU determines whether or not the value of the data obtaining flag XD is "1". When the value of the data obtaining flag XD is not "1", the CPU directly proceeds to S495 so as to terminate the present routine tentatively.

Whereas, when the value of the data obtaining flag XD is "1", the CPU proceeds to S410 from S405, and determines whether or not a value of a braking flag XB is "0". The value of the braking flag XB is set to "1" when a brake operation as a decelerating operation is started while the value of the data obtaining flag XD is "1" (refer to S420). If the brake operation has not been carried out yet since the value of the data obtaining flag XD was set to "1", the value of the braking flag XB is "0". Thus, in this case, the CPU proceeds to S415 from S410, and determines whether or not the brake operation has been started. More specifically, the CPU determines whether or not the signal of the brake switch 74 has changed from the OFF-signal to the ON-signal. When the brake operation has not been started, the CPU directly proceeds to S435 from S415. Whereas, when the brake operation has been started, the CPU proceeds to S420 from S415, and sets the value of the braking flag XB to "1". Thereafter, the CPU proceeds to S435.

Whereas, if the value of the braking flag XB is "1" when the CPU proceeds to S410, the CPU proceeds to S425 from S410. At S410, the CPU determines whether or not the brake operation has been ended (i.e., whether or not the signal of the brake switch 74 has changed from the ON-signal to the OFF-signal), and also determines whether or not the host vehicle speed Vh has become equal to or lower than "0" (i.e., whether or not the host vehicle has fully stopped). When the brake operation has not been ended and/or the host vehicle has not fully stopped, the CPU directly proceeds to S435 from S425. Whereas, when the brake operation has been ended or when the host vehicle has fully stopped, the CPU proceeds to S430 from S425, and sets the value of the braking flag XB to "0". Thereafter, the CPU proceeds to S435.

The CPU determines whether or not the value of the braking flag XB is "1" at S435. When the value of the braking flag XB is "1", the CPU proceeds to S440 from S435, and stores a current deceleration Gh (the deceleration at that time) and a current deceleration change rate Jh (which is a current change amount of the deceleration per unit time) into the RAM while associating them with the time. Thereafter, the CPU proceeds to S495 so as to terminate the present routine tentatively. It should be noted that the deceleration change rate is equal to a sign-inverted value of a jerk which is an acceleration change rate.

Whereas, if the value of the braking flag XB is "0" when the CPU proceeds to S435, the CPU proceeds to S445 from S435, and determines whether or not the present time (current time point) is immediately after a time point (i.e., a change time point) at which the value of the braking flag XB changed to "0" from "1". When the present time (current time point) is not immediately after the change time point, the CPU proceeds to S495 from S445.

If the present time (current time point) is immediately after the change time point when the CPU proceeds to S445, the CPU sequentially executes processes of S450 and S455, described below, and proceeds to S495.

S450: The CPU selects/obtains a maximum deceleration Gmx from the data of the deceleration that have been stored at S440. Subsequently, the CPU learns/updates, based on the maximum deceleration Gmx, the maximum deceleration learning value Gm for (regarding) the inter-vehicular time range (time range) to which the inter-vehicular time Tint stored at S240 shown in FIG. 2 belongs. For example, when the inter-vehicular time Tint stored at S240 is between T2 and T3, the CPU reads out (fetches) the maximum deceleration learning value Gm2 for the inter-vehicular time range to which that inter-vehicular time Tint belongs from the look-up table shown in the block B1 in FIG. 3, updates the maximum deceleration learning value Gm2 by applying the obtained maximum deceleration Gmx and the read out maximum deceleration learning value Gm2 to a right side of an equation "Gm2=α·Gmx+ (1−α). Gm2", and stores the updated maximum deceleration learning value Gm2 (which is a left side of the equation) in the corresponding inter-vehicular time range of the look-up table.

The other maximum deceleration learning value Gmn is updated in the same manner.

S455: The CPU selects/obtains data of the deceleration change rate in a period up to a time point at which the deceleration Gh reaches the maximum deceleration Gmx from the data of the deceleration change rate Jh that have been stored at S440, and obtains an "average of the selected/obtained data of the deceleration change rate Jh" as the "deceleration change rate Ja". Subsequently, the CPU learns/updates, based on the deceleration change rate Ja, the deceleration change rate learning value Jm for (regarding) the inter-vehicular time range (time range) to which the inter-vehicular time Tint stored at S240 shown in FIG. 2 belongs. For example, when the inter-vehicular time Tint stored at S240 is between T2 and T3, the CPU reads out (fetches) the deceleration change rate learning value Jm2 for the inter-vehicular time range to which that inter-vehicular time Tint belongs from the look-up table shown in the block B1 in FIG. 3, updates the deceleration change rate learning value Jm2 by applying the obtained deceleration change rate Ja and the read out deceleration change rate learning value Jm2 to a right side of an equation "Jm2=α·Ja+(1−α)·Jm2", and stores the updated deceleration change rate learning value Jm2 which is a left side of the equation in the corresponding inter-vehicular time range of the look-up table.

The other deceleration change rate learning value Jmn is updated in the same manner.

<Calculation of Required Inter-Vehicular Distance and Alert Control>

Figure 5:
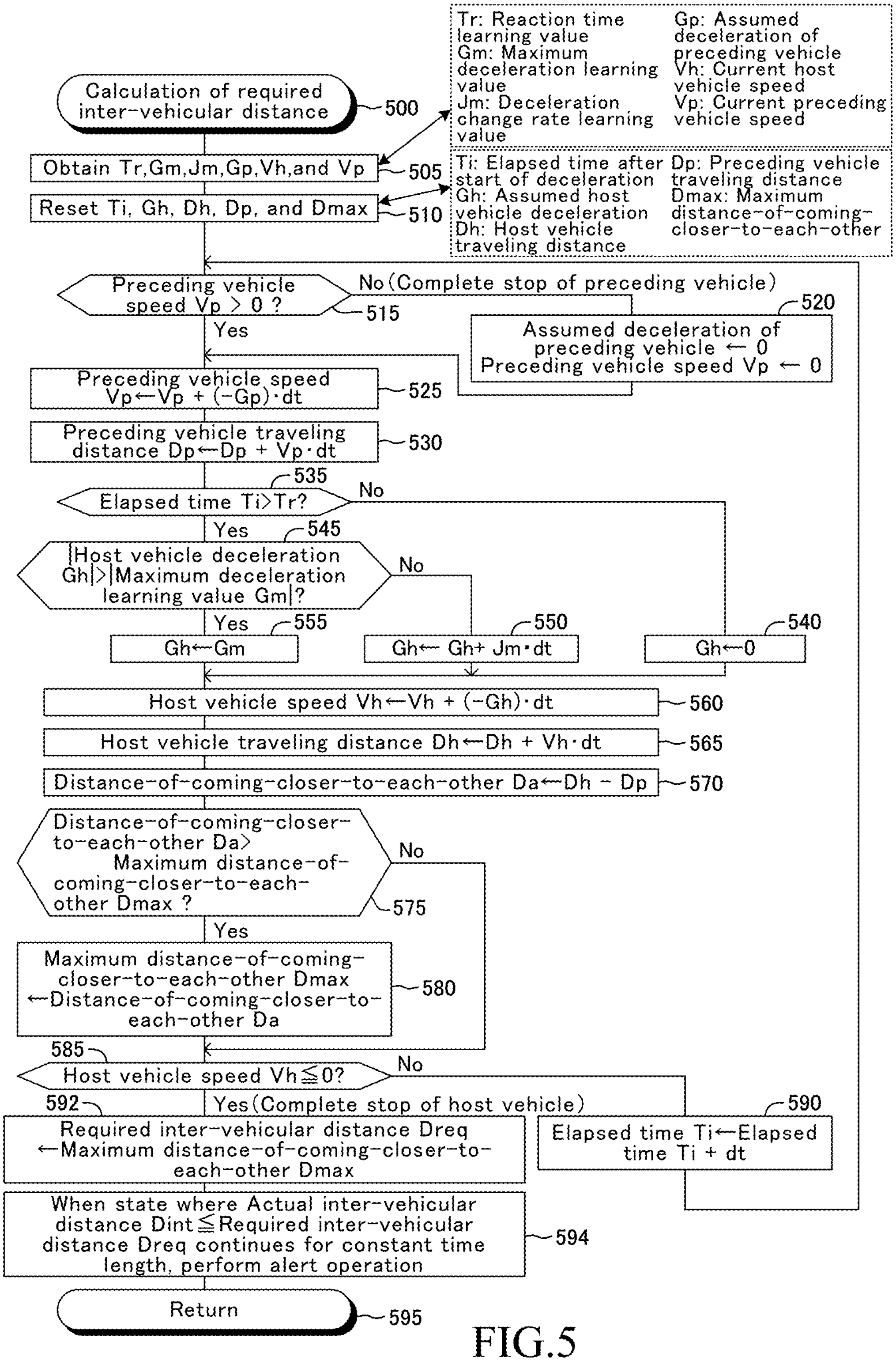
FIG. 5 shows a routine executed by the CPU of the driving support ECU shown in FIG. 1.

When a condition which is the same as the condition described in S220 becomes satisfied, the CPU determines that the following preceding vehicle state has newly occurred, and executes a routine shown in FIG. 5 every time the predetermined time dt elapses, as long as the following preceding vehicle state continues.

Accordingly, when the following preceding vehicle state continues occurring, the CPU starts processing from S500 shown in FIG. 5, and proceeds to S505. At S505, the CPU reads out (fetches) the learning values (i.e., the reaction time learning value Tr, the maximum deceleration learning value Gm, and the deceleration change rate learning value Jm) corresponding to the current inter-vehicular time Tint from the look-up table (refer to the block B1 shown in FIG. 3). Furthermore, the CPU sets an assumed deceleration of the preceding vehicle Gp to a predetermined value, obtains a current host vehicle speed Vh, and calculates a current preceding vehicle speed Vp based on the current host vehicle speed Vh and the relative speed Vr. It should be noted that the assumed deceleration of the preceding vehicle Gp is set to a value corresponding to a value between σ and 2σ in the larger side of the distribution of the deceleration determined based on the big data about a large number of vehicles, in order for the alert to be generated at a safer time point.

At S510, the CPU resets calculation variables including an elapsed time Ti from the present time point, a host vehicle deceleration Gh, a host vehicle traveling distance Dh that is a moving distance of the host vehicle from the present time point, a preceding vehicle traveling distance Dp that is a moving distance of the preceding vehicle from the present time point, and a maximum distance-of-coming-closer-to-each-other Dmax.

Subsequently, by executing processes of S515 and S520, the CPU sets each of the assumed deceleration of the preceding vehicle Gp and the preceding vehicle speed Vp to "0" (S520), when a calculated/computational preceding vehicle speed Vp is equal to or lower than "0" (i.e., when the preceding vehicle computationally fully stops, S515: No). Whereas, when the calculated/computational preceding vehicle speed Vp is higher than "0", the CPU maintains each of the assumed deceleration of the preceding vehicle Gp and the preceding vehicle speed Vp as they are (the Gp and the VP remain unchanged). Subsequently, the CPU executes processes of S525 and S530 described below.

S525: The CPU updates the preceding vehicle speed Vp by adding a "product (−Gp·dt) of an acceleration (−Gp) of the preceding vehicle and the calculation cycle dt" to the previously updated preceding vehicle speed Vp.

S530: The CPU updates the preceding vehicle traveling distance Dp by adding a "product (Vp·dt) of the updated preceding vehicle speed Vp and the calculation cycle dt" to the previously updated preceding vehicle traveling distance Dp.

Subsequently, the CPU executes some of steps from S535 to S555 so as to update the host vehicle deceleration Gh. More specifically, up to a time point at which the elapsed time Ti reaches the reaction time learning value Tr (S535: No), the CPU sets the host vehicle deceleration Gh to "0" (S540).

Whereas, when the elapsed time Ti is longer than the reaction time learning value Tr (S535: Yes),

- the CPU updates the host vehicle deceleration Gh (S550) by adding a "product (Jm·dt) of the deceleration change rate learning value Jm and the calculation cycle dt" to the previously updated host vehicle deceleration Gh, if an absolute value of the host vehicle deceleration Gh is equal to or smaller than the absolute value of the maximum deceleration learning value Gm (S545: No), and
- the CPU sets the host vehicle deceleration Gh to the maximum deceleration learning value Gm (S555), if the absolute value of the host vehicle deceleration Gh is greater than the absolute value of the maximum deceleration learning value Gm (S545: Yes).

Subsequently, the CPU executes processes of steps from S560 to S570 described below.

S560: The CPU updates the host vehicle speed Vh by adding a "product (−Gh·dt) of the host vehicle acceleration (=−(host vehicle deceleration Gh)) and the calculation cycle dt" to the previously updated host vehicle speed Vh.

S565: The CPU updates the host vehicle traveling distance Dh by adding a "product (Vh·dt) of the host vehicle speed Vh and the calculation cycle dt" to the previously updated host vehicle traveling distance Dh.

S570: The CPU updates the distance-of-coming-closer-to-each-other Da by subtracting the preceding vehicle traveling distance Dp from the host vehicle traveling distance Dh.

Subsequently, the CPU executes processes of S575 and S580 so as to set the maximum distance-of-coming-closer-to-each-other Dmax to the distance-of-coming-closer-to-each-other Da calculated at S570 (S580), when the distance-of-coming-closer-to-each-other Da calculated at S570 is greater than the previously updated maximum distance-of-coming-closer-to-each-other Dmax (S575: Yes). Whereas, when the distance-of-coming-closer-to-each-other Da calculated at S570 is equal to or smaller than the previously updated maximum distance-of-coming-closer-to-each-other Dmax (S575: No), the CPU maintains the previously updated maximum distance-of-coming-closer-to-each-other Dmax as it is (i.e., the CPU makes Dmax remain unchanged).

Thereafter, the CPU proceeds to S585 and determines whether or not the host vehicle speed Vh is equal to or lower than "0" (i.e., whether or not the host vehicle has computationally fully stopped). When the host vehicle speed Vh is higher than "0", the CPU proceeds to S590, and increases the elapsed time Ti by the calculation cycle dt. Thereafter, the CPU returns to S515.

Whereas, when the host vehicle speed Vh is equal to or lower than "0", the CPU proceeds to S592 from S585, and sets the required inter-vehicular distance Dreq to the maximum distance-of-coming-closer-to-each-other Dmax. Namely, the required inter-vehicular distance Dreq is equal to the maximum distance-of-coming-closer-to-each-other Dmax in a period up to a time point at which the host vehicle computationally fully stops. The CPU may set the required inter-vehicular distance Dreq to a value obtained by adding a predetermined positive value Ds to the maximum distance-of-coming-closer-to-each-other Dmax.

Subsequently, the CPU proceeds to S594, and determines whether or not a "state where the actual current inter-vehicular distance Dint is equal to or shorter than the required inter-vehicular distance Dreq" continues for a predetermined constant time length or longer. The "state where the actual inter-vehicular distance Dint is equal to or shorter than the required inter-vehicular distance Dreq" is referred to as a short inter-vehicular distance state (or an insufficient inter-vehicular distance state). When the short inter-vehicular distance state continues for the predetermined constant time length or longer, the CPU performs the alert operation. Namely, the CPU causes the alert/warning display device 51 to display an alert (e.g., a design and/or letters, for calling the driver's attention to notify the driver of the host vehicle that the inter-vehicular distance is too short), and causes the alert sound generation device 52 to generate an alert sound (e.g., a waring sound and/or a voice message, for calling the driver's attention to notify the driver of the host vehicle that the inter-vehicular distance is too short). It should be noted that the CPU may determine that the short inter-vehicular distance state is occurring, when an actual inter-vehicular time is equal to or shorter than a required inter-vehicular time. The required inter-vehicular time is obtained by dividing the required inter-vehicular distance Dreq by an actual current host vehicle speed Vh. The actual inter-vehicular time is obtained by dividing the actual inter-vehicular distance Dint by the current actual host vehicle speed Vh.

Figure 6A:
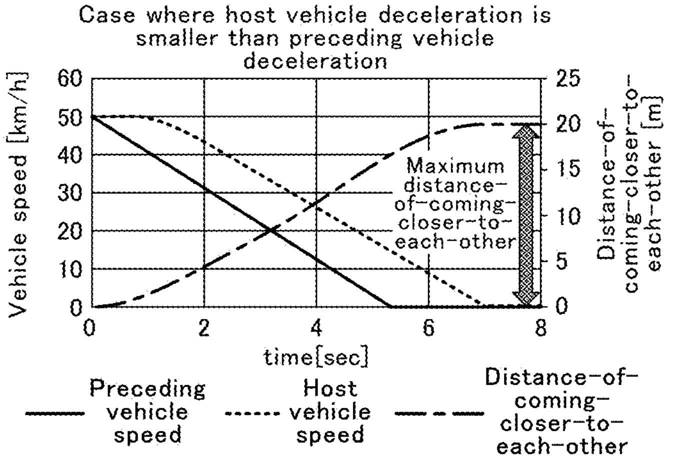
FIG. 6A is a graph for describing a maximum distance-of-coming-closer-to-each-other.
Figure 6B:
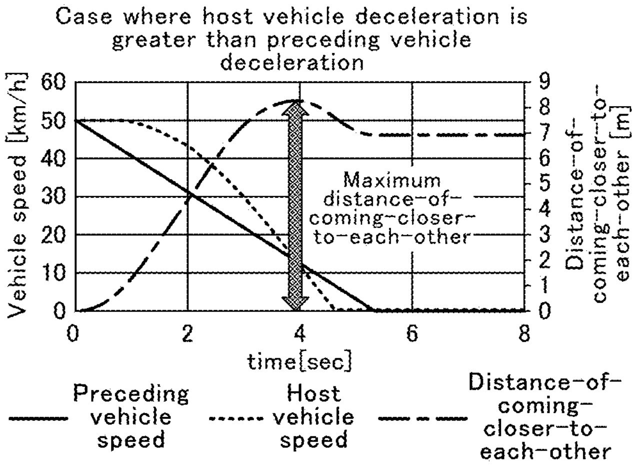
FIG. 6B is a graph for describing a maximum distance-of-coming-closer-to-each-other.
Figure 6C:
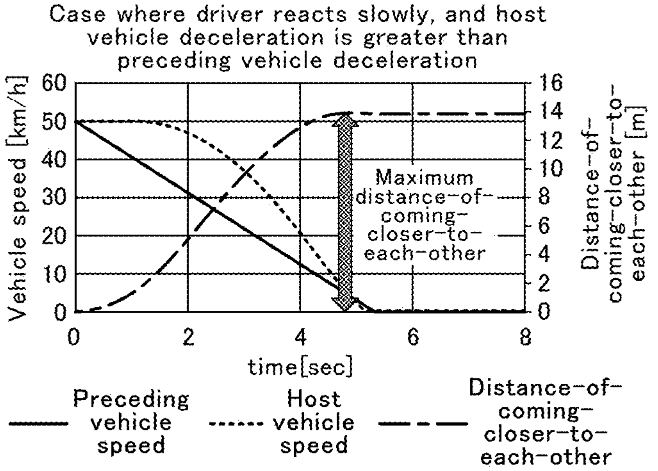
FIG. 6C is a graph for describing a maximum distance-of-coming-closer-to-each-other.

FIGS. 6A to 6C are graphs showing "the host vehicle speed, the preceding vehicle speed, the distance-of-coming-closer-to-each-other, and the maximum distance-of-coming-closer-to-each-other" calculated in the above-described manner. FIG. 6A shows those values when the maximum deceleration learning value Gm is smaller than the assumed deceleration of the preceding vehicle Gp (i.e., when the host vehicle decelerates more slowly than the preceding vehicle). FIG. 6B shows those values when the maximum deceleration learning value Gm is greater than the assumed deceleration of the preceding vehicle Gp (i.e., when the host vehicle decelerates more rapidly than the preceding vehicle). FIG. 6C shows those values when the maximum deceleration learning value Gm is greater than the assumed deceleration of the preceding vehicle Gp, but the driver of the host vehicle reacts slowly (i.e., the reaction time learning value Tr is relatively long).

As has been described above, the embodiment according to the present disclosure updates/obtains the operation characteristics learning values based on the "operation characteristics values representing the characteristics of the decelerating operation performed by the driver of the host vehicle to decelerate the host vehicle" that are obtained/measured during the critical situation in which the rapid approach condition is satisfied. Therefore, the operation characteristics learning values are values that can appropriately represent the operation characteristics of the driver in the critical situation where the preceding vehicle suddenly starts decelerating rapidly. This allows the required inter-vehicular distance obtained/calculated based on the operation characteristics learning values to become more appropriate for the driver of the host vehicle. In addition, since the operation characteristics learning values are set for respective inter-vehicular time ranges, the "operation characteristics learning values for a state that is more similar to an actual state where the host vehicle comes closer to the preceding vehicle" are used to calculate the required inter-vehicular distance. Accordingly, the apparatus DS of the embodiment can perform the alert operation at a more appropriate timing.

It should be noted that the present disclosure is not limited to the above embodiment, and may adopt various modifications within the scope of the present disclosure. For example, at S240, the CPU may store a combination of the inter-vehicular distance Dint and the host vehicle speed Vh, as values representing a state of that time point, in place of the inter-vehicular time Tint. In this case, the look-up table shown in the block B1 in FIG. 3 (i.e., a look-up table for storing the operation characteristics learning values) may be designed to have/store operation characteristics learning values for each of the combinations of the inter-vehicular distance Dint and the host vehicle speed Vh. Also in this case, at S505, the CPU reads out the operation characteristics learning values in accordance with the combination of the inter-vehicular distance Dint and the host vehicle speed Vh of that time point from the look-up table. Furthermore, the present disclosure can be applied to an autonomous driving vehicle, when the vehicle driving mode is changed from an autonomous driving mode to a mode where the driver drives the vehicle.

What is claimed is:

1. An alert apparatus comprising:

a first obtaining device that obtains host vehicle information including information on a host vehicle speed which is a speed of a host vehicle and information on an operation state of a brake pedal of said host vehicle;

a second obtaining device that obtains preceding vehicle information including information on an inter-vehicular distance between a preceding vehicle and said host vehicle and information on a relative speed of said preceding vehicle;

an alert device that performs, as an alert operation to call a host vehicle driver's attention, at least one of an alert display and an alert sound generation; and a controller that controls said alert device, wherein, said controller is configured to:

when said controller determines, based on said host vehicle information and said preceding vehicle information, that a predetermined rapid approach condition becomes satisfied, said rapid approach condition being a condition to be satisfied when said host vehicle and said preceding vehicle start to rapidly come closer to each other, while a following preceding vehicle state in which said host vehicle is traveling so as to follow said preceding vehicle owing to a driving operation by said host vehicle driver is occurring, obtain, based on said host vehicle information, operation characteristics values representing characteristics of a deceleration operation performed by said host vehicle driver to decelerate said host vehicle after a time point at which said rapid approach condition becomes satisfied, and store operation characteristics learning values that vary depending on said operation characteristics values in a storing device; and when said controller determines that said following preceding vehicle state has newly occurred, calculate, based on said operation characteristics learning values, a required inter-vehicular distance which said host vehicle should maintain between said host vehicle and said preceding vehicle, and cause said alert device to perform said alert operation when said controller determines that an alert condition including a condition to be satisfied when said inter-vehicular distance currently obtained is equal to or shorter than said required inter-vehicular distance is satisfied.

2. The alert apparatus according to claim 1, wherein, said controller is configured to determine whether or not said rapid approach condition becomes satisfied, by determining whether or not, based on at least one of said inter-vehicular distance and said relative speed, a condition to be satisfied when a decreasing amount of said inter-vehicular distance per unit time becomes equal to or greater than a threshold in said following preceding vehicle state is satisfied.

3. The alert apparatus according to claim 2, wherein, said controller is configured to:

obtain, as said operation characteristics values, a reaction time which is a time length from a time point at which said rapid approach condition becomes satisfied to a time point at which an operation to said brake pedal by said host vehicle driver is started;

a deceleration of said host vehicle caused by said operation to said brake pedal after said time point at which said rapid approach condition becomes satisfied, and a deceleration change rate which is a change amount of said deceleration of said host vehicle per unit time, said deceleration caused by said operation to said brake pedal after said time point at which said rapid approach condition becomes satisfied;

obtain and store in said storing device, as said operation characteristics learning values, a reaction time learning value which varies depending on said obtained reaction time, a deceleration learning value which varies depending on said obtained deceleration of said host vehicle, and a deceleration change rate learning value which varies depending on said obtained deceleration change rate; and calculate, as said required inter-vehicular distance, a maximum distance-of-coming-closer-to-each-other or a value corresponding to said maximum distance-of-coming-closer-to-each-other, said maximum distance-of-coming-closer-to-each-other being a maximum value of a magnitude of a decreasing amount of said inter-vehicular distance in a period up to a time point at which it is assumed that said host vehicle and said preceding vehicle come closest to each other, based on said reaction time learning value, said deceleration learning value, said deceleration change rate learning value, a preceding vehicle speed which is a moving speed of said preceding vehicle at a present time point that is obtained based on said host vehicle speed at the present time point and said relative speed at the present time point, and a predetermined assumed deceleration of said preceding vehicle that is an assumed deceleration of said preceding vehicle.

4. The alert apparatus according to claim 3, wherein, said controller is configured to:

store said operation characteristics learning values with associating them with one of time ranges to which a rapid approach inter-vehicular time belongs, said rapid approach inter-vehicular time being a value obtained by dividing said inter-vehicular distance of when said rapid approach condition becomes satisfied by said host vehicle speed of when said rapid approach condition becomes satisfied; and calculate said required inter-vehicular distance based on said operation characteristics learning values that have been stored in one of said time ranges to which a new inter-vehicular time belongs, said new inter-vehicular time being a value obtained by dividing said inter-vehicular distance of when said following preceding vehicle state is determined to have newly occurred by said host vehicle speed of when said following preceding vehicle state is determined to have newly occurred.

5. An alert method for performing, as an alert operation to call driver's attention of a host vehicle to a preceding vehicle, at least one of an alert display and an alert sound generation comprising:

a step of determining whether or not a predetermined rapid approach condition becomes satisfied, said rapid approach condition being a condition to be satisfied when said host vehicle and said preceding vehicle start to rapidly come closer to each other, while a following preceding vehicle state in which said host vehicle is traveling so as to follow said preceding vehicle owing to a driving operation by said driver of said host vehicle is occurring;

a step of obtaining operation characteristics values representing characteristics of a deceleration operation performed by said driver of said host vehicle to decelerate said host vehicle after a time point at which said rapid approach condition becomes satisfied, when it is determined that said rapid approach condition becomes satisfied, and storing operation characteristics learning values that vary depending on said operation characteristics values in a storing device, wherein the obtaining operation characteristic values comprises receiving data from at least one vehicle mounted sensor; and a step of calculating, using said operation characteristics learning values, a required inter-vehicular distance which said host vehicle should maintain between said host vehicle and said preceding vehicle, when it is determined that said following preceding vehicle state has newly occurred; and a step of performing said alert operation, using at least one of the alert display or a speak, when it is determined that an alert condition including a condition to be satisfied when said inter-vehicular distance is equal to or shorter than said required inter-vehicular distance is satisfied.

6. A non-transitory storage medium storing a program for performing as an alert operation to call driver's attention of a host vehicle to a preceding vehicle, at least one of an alert display and an alert sound generation, said program causing a computer to implement:

a step of determining whether or not a predetermined rapid approach condition becomes satisfied, said rapid approach condition being a condition to be satisfied when said host vehicle and said preceding vehicle start to rapidly come closer to each other, while a following preceding vehicle state in which said host vehicle is traveling so as to follow said preceding vehicle owing to a driving operation by said driver of said host vehicle is occurring;

a step of obtaining operation characteristics values representing characteristics of a deceleration operation performed by said driver of said host vehicle to decelerate said host vehicle after a time point at which said rapid approach condition becomes satisfied, when it is determined that said rapid approach condition becomes satisfied, and storing operation characteristics learning values that vary depending on said operation characteristics values in a storing device, wherein the obtaining operation characteristic values comprises receiving data from at least one vehicle mounted sensor; and a step of calculating, using said operation characteristics learning values, a required inter-vehicular distance which said host vehicle should maintain between said host vehicle and said preceding vehicle, when it is determined that said following preceding vehicle state has newly occurred; and a step of performing said alert operation, using at least one of the alert display or a speaker, when it is determined that an alert condition including a condition to be satisfied when said inter-vehicular distance is equal to or shorter than said required inter-vehicular distance is satisfied.

* * * * *